April 28, 1959     C. J. STOVER     2,884,063
SHEAR FOR CHANNELS OR THE LIKE

Filed Aug. 22, 1956     3 Sheets-Sheet 1

*INVENTOR.*
CARRELL J. STOVER
BY

ATTORNEYS

INVENTOR.
CARRELL J. STOVER

_United States Patent Office_

2,884,063
Patented Apr. 28, 1959

2,884,063

SHEAR FOR CHANNELS OR THE LIKE

Carrell J. Stover, Jenkintown, Pa., assignor to The Allen Iron & Steel Company, Norristown, Pa., a corporation of Pennsylvania Application August 22, 1956, Serial No. 605,615

1 Claim. (Cl. 164—47)

This invention relates to a shear which is particularly advantageous for use in shearing channel members, for example, substantially U-shaped channels.

In shearing a U-shaped channel, in addition to providing adequate support for the bottom or web portion of the channel, it is also necessary to provide lateral support for the upstanding or flange portions of the channel. The problem of lateral support is a difficult one. Where the channel is sheared with a single stroke of the cutter, the prior art shears provide for simultaneous support of both flanges. Where a fixed supporting mechanism is employed, the result is unsatisfactory due to the inherent variations in the sizes of the channels. If the channel is slightly undersized, inadequate support is provided and the flanges will be permanently deformed outwardly during the shearing operation. If the channel is slightly oversized, it cannot readily pass through the supporting structure. In either event the burrs thrown outwardly by the shearing process often make it difficult or impossible to readily slide the channel through the supporting structure into position for the next cut. If the channel is slightly under-sized, inadequate support is provided while, if it is slightly over-sized, it tends to jam in the supporting structure. Heretofore the attempts to solve this problem have taken the form of either moveable side supports which come into operation just before a single stroke of the cutter or the form of a multiple stroke of the cutter for each complete shearing of the channel. Both of these forms involve the use of complex and hence costly mechanisms.

In accordance with this invention, the problem has been solved while still retaining a single stroke action of the cutter and a fixed supporting structure for the channel member, the shape of the cutter being such that during the first portion of the cut, one flange of the channel member is urged against one side of a channel support while for the second portion of the cut, the channel member is shifted laterally to provide for the support of the other flange member by the other side of the channel support. The shear of this invention is highly advantageous in that it is inexpensive to construct and can be operated to provide a high rate of production without any jamming of the channels in the supporting structure.

This invention will be further clarified by reading of the following description in conjunction with the drawings in which.

Figure 1:
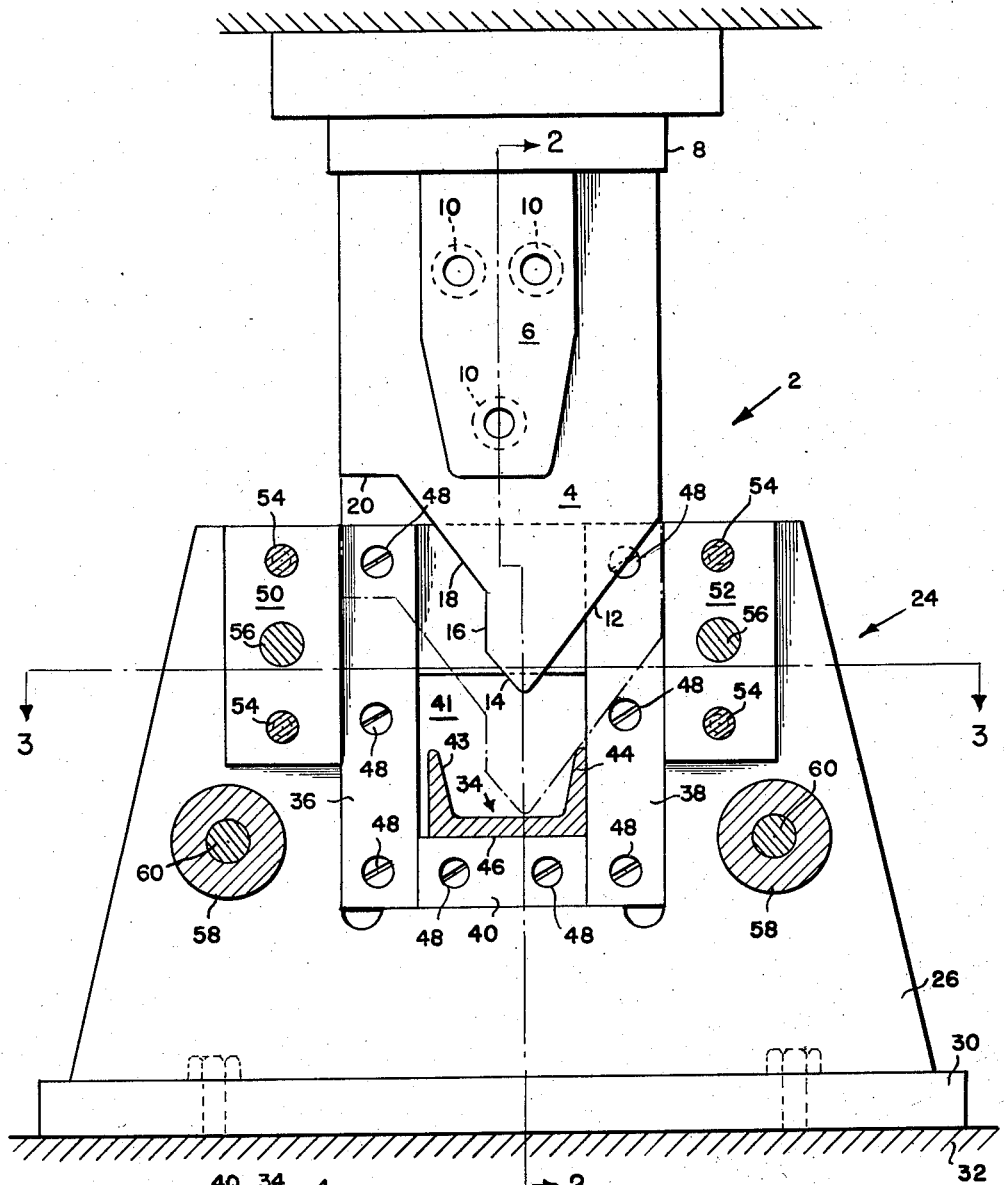
Figure 1 is a vertical section of a shear in accordance with this invention taken on the planes indicated by the lines 1—1 in Figure 2.

As shown in the figures, a shear 2 in accordance with this invention has a hardened steel cutter blade 4 secured to a depending arm 6 of a ram 8. Cutter blade 4 is secured to arm 6 by means of machine screws 10. Cutter blade 4, at its lower cutting end, has a plurality of flat faces 12, 14, 16, 18 and 20, all of which lie in different planes, the edges of faces 12, 14 and 18 forming side cutting edges. As best seen in Figure 1, the lower end of cutter 4 is V-shaped modified by recessing a portion of one of the faces of the V. Thus cutting faces 12 and 14 form a portion of a V and cutting face 18 is recessed sufficiently so as not to engage channel 34 until faces 12 and 14 have completed their cuts.

Figure 3:
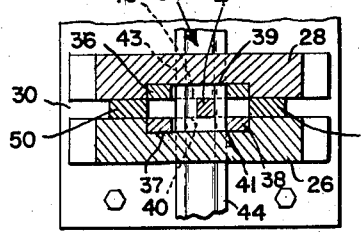
Figure 3 is a horizontal section taken on the plane indicated by the line 3—3 in Figure 1.
Figure 2:
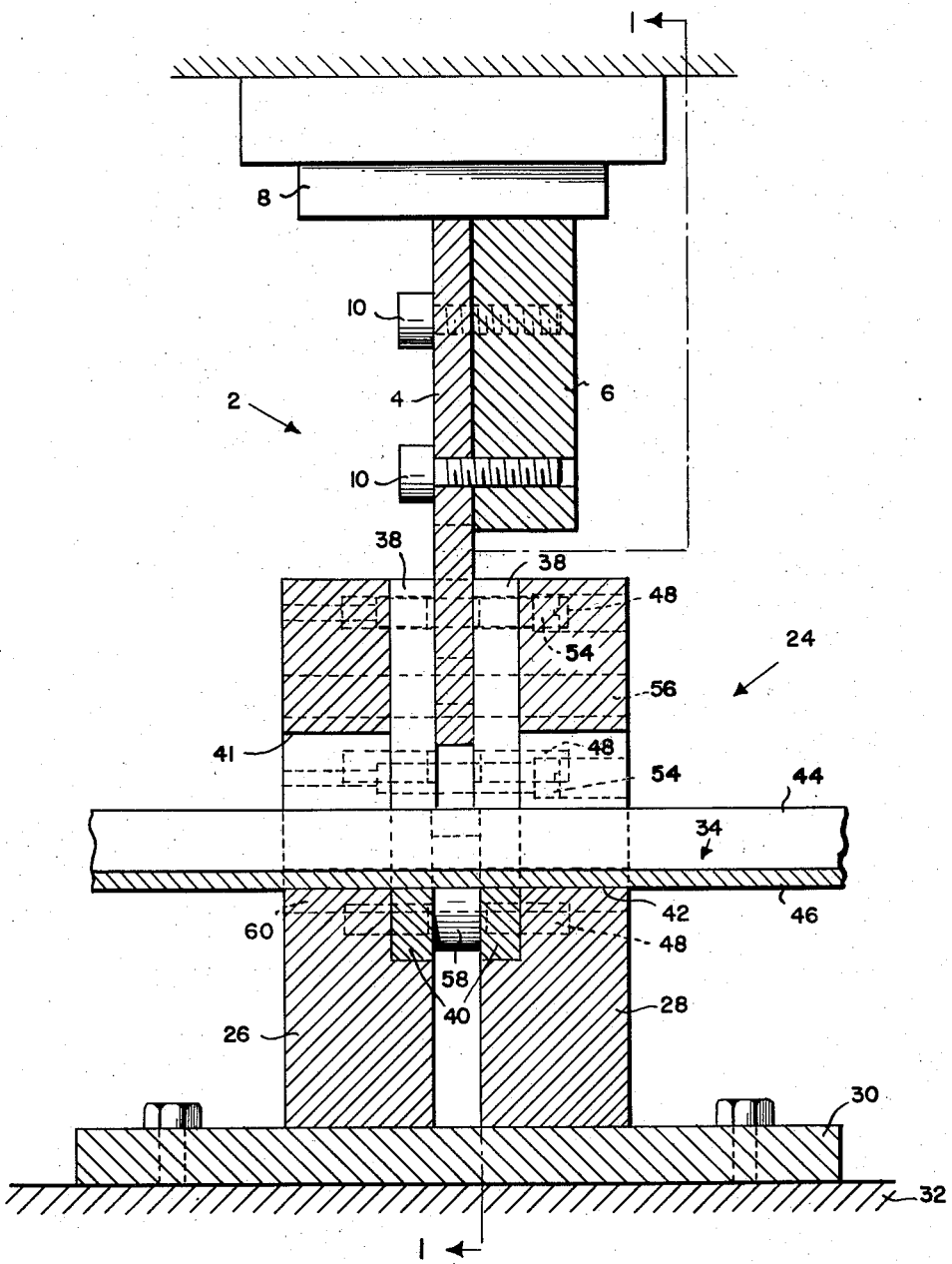
Figure 2 is a vertical section taken on the plane indicated by the lines 2—2 in Figure 1.

A support 24 has a pair of upstanding blocks 26 and 28 welded to a base 30 which may be secured to a bed 32. Support 24 is provided with two identical sets of hardened steel shear blocks lying in recessed portions 37 and 39 (Figure 3) of blocks 26 and 28, respectively, on either side of the path of cutter blade 4. Each set of shear blocks comprises side shear blocks 36 and 38 and a bottom shear block 40. Bottom shear blocks 40 are recessed in blocks 26 and 28, respectively, below openings 41 and 42 (Figure 2) which are adapted to receive a channel member 34 having flanges 43 and 44 and a web portion 46. The shear blocks are secured to blocks 26 and 28, respectively, by means of machine screws 48.

The ends of cutter blade 4 are guided by a pair of hardened steel insert blocks 50 and 52 secured between blocks 26 and 28 by means of machine screws 54 and dowel pins 56. Insert blocks 50 and 52 also act to space blocks 26 and 28 apart to permit the free movement of cutter 4. Blocks 26 and 28 are additionally spaced apart by a pair of spacer rings 58 secured in position by dowel pins 60.

In operation, the channel 34 is fed into openings 41 and 42 and the ram is then actuated to lower cutter blade 4. Face 12 engages flange 44 and forces channel 34 laterally until flange 44 bears against shear blocks 38, 38. Face 12 and face 14 then, together with the shearing edge of stem blocks 38, 38 and 40, 40 cut out a portion of channel 34. Next, face 18 engages flange 43 and shifts channel 34 to bring flange 43 into contact with shear blocks 36, 36. Face 18 then completes the cut through channel 34. The cutter blade is then moved upwardly. In its movement the cutter blade is guided by blocks 50 and 52 and shear blocks 36, 36, 38, 38 and 40, 40.

It will be evident that the configuration of the cutting faces of the cutter may vary widely, the basic requisite being that one cutting face engage and cam one flange of the channel against its adjacent support and cut through said flange before a second cutting face engages the opposite flange to cam it to shift the channel member so as to have the second flange supported by its adjacent support. To achieve this result the side cutting edges will be inclined downwardly and toward each other from the points of intersection of the side cutting edges with the shearing edges of the vertical shear blocks. The vertical distance from the cutting end of the cutter blade to the line of intersection of the bottom shear blocks and one of said pairs of vertical shear blocks will be greater than the vertical distance from the cutting end to the closest portion of the flange adjacent the other pair of vertical shear blocks by an amount greater than the outside height of the flange of the channel being cut. The lowest point of the cutter blade will depend from the cutting end where it first commences to cut the first engaged flange a vertical distance less than the height of the first engaged flange above the web. It is preferable to have the cutting faces at an angle not less than 15° with the plane of the web of the channel member at the points where they engage the flanges for the best camming action. Other configurations are illustrated by way of example in the schematic showings of Figures 4 through 6.

Figure 4:
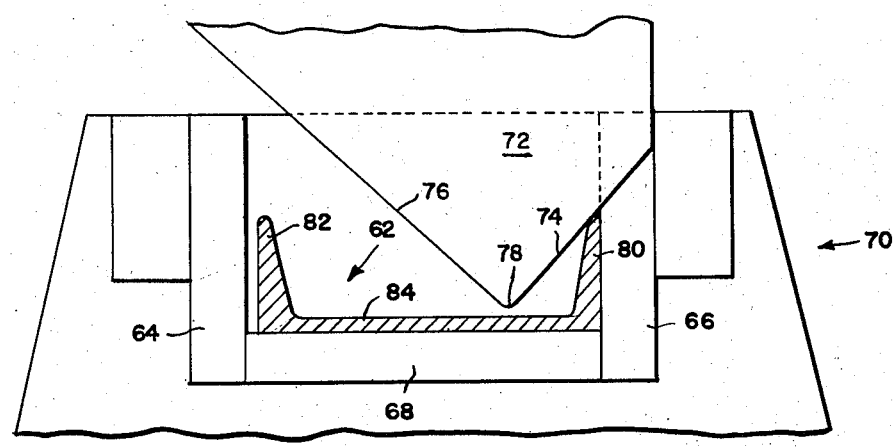
Figure 4 is a schematic view showing a modified cutter blade in accordance with this invention.

Referring to Figure 4, a channel member 62 is shown in association with side shear blocks 64 and 66 and bottom shear block 68 of shear 70 which is of the kind shown in the earlier figures. A blade 72 mounted for vertical movement has a cutting face 74 and a cutting face 76 meeting at 78 which is off center with respect to the center line of block 68. Face 74 first engages and cuts through flange 80. Subsequently face 76 engages flange 82, cams it against the adjacent side shear blocks 64 and cuts through it. During the stroke, faces 74 and 76 cut through web 84.

Figure 5:
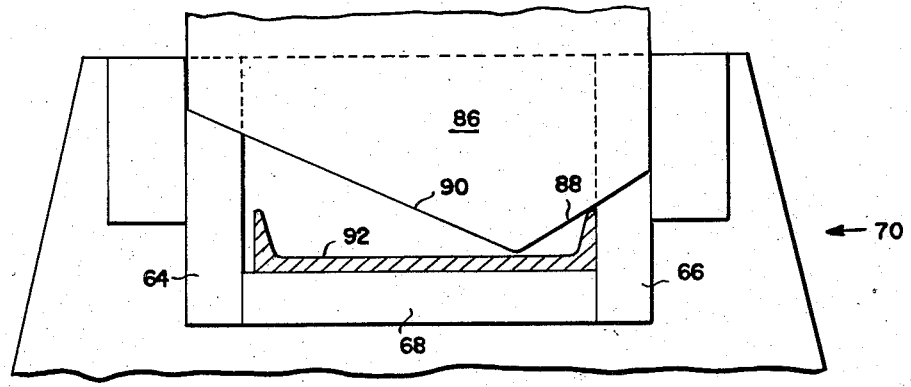
Figure 5 is a schematic view showing a modified cutter blade in accordance with this invention.

Figure 5 shows a slightly modified cutter blade 86 which differs from the blade of Figure 4 in that faces 88 and 90 both make a smaller angle with respect to the plane of the web of the channel being cut. Here the sequence of cutting channel member 92 is the same as described for Figure 4 above.

Figure 6:
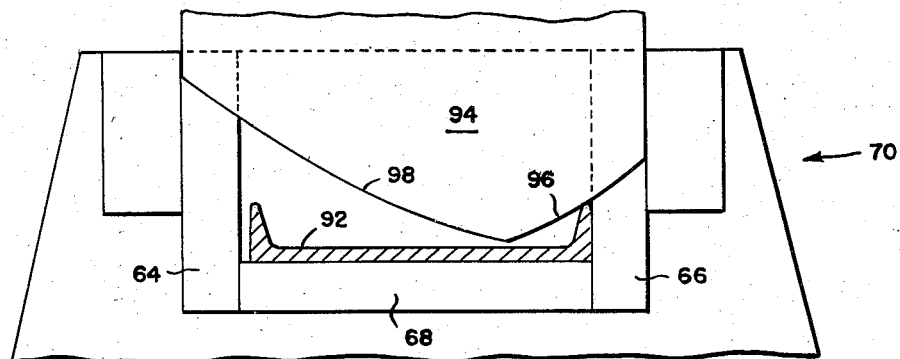
Figure 6 is a schematic view showing a modified cutter blade in accordance with this invention.

As shown in Figure 6, the cutter faces may be arcuate. Here a blade 94 is essentially the same as blade 86 except that the faces 96 and 98 corresponding to faces 88 and 90 are arcuate.

It is not desired to be limited except as set forth in the following claim.

What is claimed is:

In a machine for shearing a channel shaped member having a web and upstanding flanges: support means for the channel member including opposed pairs of vertical shear blocks and bottom shear blocks, the distance between said pairs of vertical shear blocks being greater than the outer width of the channel, a space between the shear blocks of each of the vertical pairs of shear blocks and a space between the bottom shear blocks, a cutter blade having a cutting end and means to move said cutter blade in said spaces in a vertical plane, the cutting end of said blade having side cutting edges, said side cutting edges being inclined downwardly and toward each other from the points of intersection of the said side cutting edges with the shearing edges of the vertical shear blocks, the vertical distance from said cutting end to the line of intersection of the bottom shear blocks and one of said pairs of vertical shear blocks being greater than the vertical distance from the cutting end to the closest portion of the flange adjacent the other pair of vertical shear blocks by an amount greater than the outside height of the flange of the channel and the lowest point of the cutter blade depending from the cutting end where it first commences to cut the first engaged flange a vertical distance less than the height of the first engaged flange above the web whereby the cutter blade cams one flange of the channel against the adjacent pair of vertical shear blocks and cuts completely through said flange and then cams the other flange against its adjacent pair of vertical shear blocks and cuts through said other flange.

References Cited in the file of this patent

UNITED STATES PATENTS

| | | |
|---|---|---|
| 515,746 | Cameron | Mar. 6, 1894 |
| 532,988 | Pfouts | Jan. 22, 1895 |
| 631,832 | Thackeray | Aug. 29, 1899 |
| 683,289 | John | Sept. 24, 1901 |
| 2,236,833 | Pell | Apr. 1, 1941 |
| 2,555,069 | Verney | May 29, 1951 |

FOREIGN PATENTS

| | | |
|---|---|---|
| 10,746 | Great Britain | Apr. 30, 1897 |